United States Patent [19]

Seko et al.

[11] Patent Number: 4,985,816

[45] Date of Patent: Jan. 15, 1991

[54] VEHICLE HEADLAMP

[75] Inventors: Yasutoshi Seko; Tomoko Saito, both of Yokohama, Japan

[73] Assignee: Nissan Motor Company, Ltd., Japan

[21] Appl. No.: 329,226

[22] Filed: Mar. 27, 1989

[30] Foreign Application Priority Data

Mar. 28, 1988 [JP] Japan .................................. 63-71906

[51] Int. Cl.$^5$ .............................................. F21V 7/00
[52] U.S. Cl. ...................................... 362/303; 362/61;
362/268; 362/277; 362/293; 362/319
[58] Field of Search .................. 362/61, 80, 268, 277,
362/293, 300, 303, 319, 351, 280

[56] References Cited

U.S. PATENT DOCUMENTS 4,323,952 4/1982 Proske .............................. 362/280 X
4,875,141 10/1989 Miyauchi et al. ................ 362/277 X

FOREIGN PATENT DOCUMENTS 54-109856 8/1979 Japan .

Primary Examiner—Stephen F. Husar
Attorney, Agent, or Firm—Lowe, Price, Leblanc, Becker & Shur

[57] ABSTRACT

Disclosed herein is a vehicle headlamp which comprises an ellipsoidal light reflector having first and second focuses; a light source positioned at the first focus, so that light rays produced by the light source are reflected forward by the light reflector and converged at the second focus; a converging lens positioned in front of the second focus; a shading device positioned near the second focus for partially shading the light rays which have been reflected by the light reflector; and control means for controlling the shading characteristic of the shading device in accordance with an operation mode of the vehicle, wherein said shading device comprises a liquid crystal matrix which has a plurality of small light transmitting elements independently and electrically controlled by said control means.

13 Claims, 10 Drawing Sheets

FIG. 3A
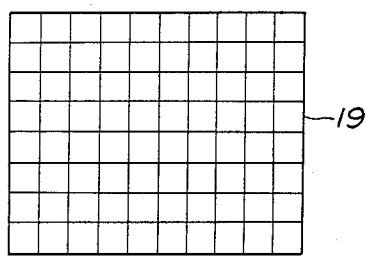
FIG. 3B
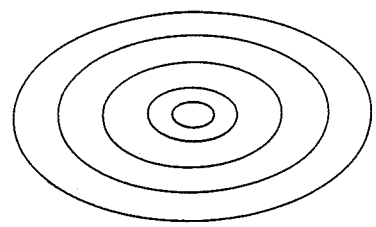
FIG. 4A
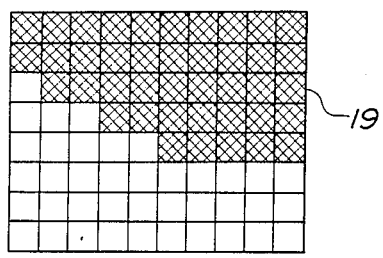
FIG. 4B
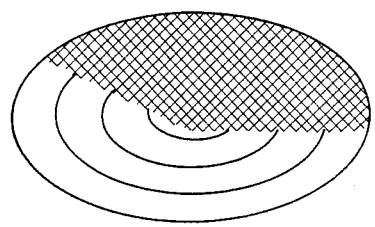
FIG. 5A
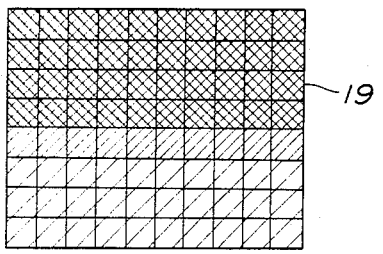
FIG. 5B
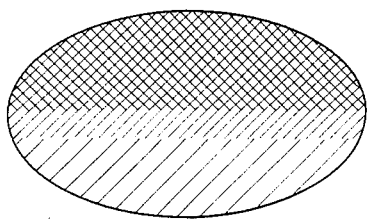
FIG. 5C
☐ : LIGHT TRANSMITTANCE 100%
▨ } : 50 ~ 70%
▩ : 0%

TRIGGER SIGNAL

FIG.19A
FIG.19B
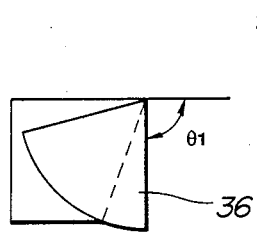
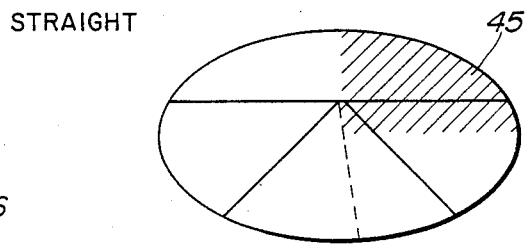
STRAIGHT
FIG.20A
FIG.20B
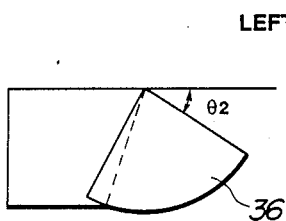
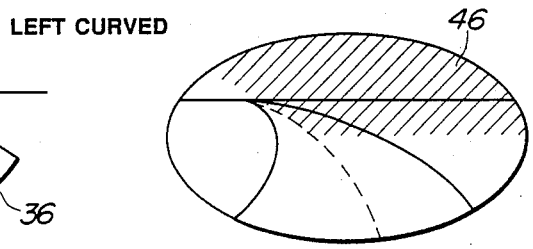
LEFT CURVED
FIG.21A
FIG.21B
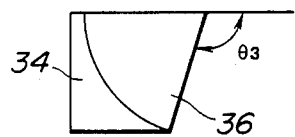
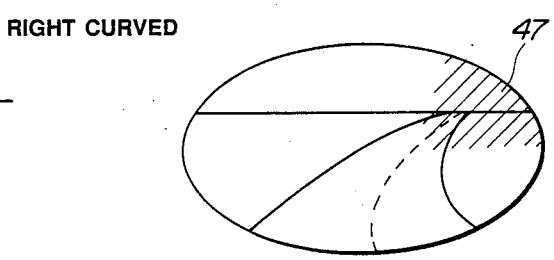
RIGHT CURVED

VEHICLE HEADLAMP

BACKGROUND OF THE INVENTION

1. Field of the Invention

The present invention relates in general to vehicle headlamps, and more particularly, to vehicle headlamps of a so-called "projector type" which comprises an ellipsoidal light reflector with first and second focuses, a light source located at the first focus, a shade member located in the vicinity of the second focus and a converging lens located in front of the shade member.

2. Description of the Prior Art

One type of conventional headlamps of the above-mentioned projector type is shown in Japanese Utility Model First Provisional Publication No. 54-109856.

In order to clarify the task of the present invention, the headlamp of that publication will be outlined with reference to FIGS. 22 and 23 of the accompanying drawings.

The headlamp comprises an ellipsoidal light reflector 2 which has an optical axis designated by numeral 1. A lamp bulb 4 is located at a first focus $f_1$ of the reflector 2, and a shade member 7 is located near a second focus $f_2$ of the reflector 2 having its upper edge contact with the optical axis 1. A coverging lens 6 is located in front of the second focus $f_2$. As shown in FIG. 7, the upper edge of the shade member 7 is partially slanted.

When the bulb 4 is energized and thus produces light rays, the light rays directed toward the reflector 2 are reflected forward by the same and converged at the second focus $f_2$ of the reflector 2. Due to presence of the upper edge of the shade member 7 near the second focus $f_2$, part of the light rays from the reflector 2 is shaded. Thus, the light beam projected forward from the converging lens 6 has a contoured cross-sectional pattern with an inverted image of the upper edge of the shade member 7. Due to this, the beam produced by the headlamp is relatively small in sectional area as compared with that of a commonly used vehicle headlamp.

However, the above-mentioned projector type headlamp has the following drawbacks.

That is, the beam pattern produced by such headlamp is fixed relative to the vehicle on which the headlamp is mounted. This means that the influcence of the beam pattern (viz., blinding phenomenon) to the driver on an approaching vehicle on the opposite lane greatly changes depending on whether the vehicle is running on a straight road or a curved road.

SUMMARY OF THE INVENTION

It is therefore an object of the present invention, to provide a projector type vehicle headlamp which is free of the above-mentioned drawbacks.

According to the present invention, there is provided a projector type vehicle headlamp which suppresses or at least minimizes the undesired "blinding phenomenon" to approaching drivers.

According to the present invention, there is provided a projector type vehicle headlamp which comprises a shading structure arranged near a second focus of an ellipsoidal light reflector, the shading structure being adjustable in light shading characteristic.

According to the present invention, there is provided a projector type vehicle headlamp which produces both low and high beams by using only one lamp bulb.

According to the present invention, there is provided a vehicle headlamp which comprises an ellipsoidal light reflector having first and second focuses; a light source positioned at the first focus, so that light rays produced by the light source are reflected forward by the light reflector and converged at the second focus; a converging lens positioned in front of the second focus; a shading device positioned near the second focus for partially shading the light rays which have been reflected by the light reflector; and control means for controlling the shading characteristic of the shading device in accordance with an operation mode of the vehicle, wherein said shading device comprises a liquid crystal matrix which has a plurality of small light transmitting elements independently and electrically controlled by said control means.

BRIEF DESCRIPTION OF THE DRAWINGS

Other objects and advantages of the present invention will become apparent from the following description when taken in conjunction with the accompanying drawings, in which:

FIG. 3A is a plan view of a liquid crystal plate of the matrix showing a condition wherein a high beam is produced by the headlamp;

FIG. 3B is a view of a contoured cross-sectional pattern possessed by the high beam;

FIG. 4A is a view similar to FIG. 3A, but showing a condition wherein a low beam is produced by the headlamp;

FIG. 4B is a view of a contoured cross-sectional pattern possessed by the low beam;

FIG. 5A is a view similar to FIG. 3A, but showing a condition wherein an intermediate beam is produced by the headlamp;

FIG. 5B is a view of a contoured cross-sectional pattern possessed by the intermediate beam;

FIG. 5C is a chart showing the correspondence of the hatched unit part illustrated in FIGS. 3A, 4A and 5A to the light transmittance possessed by the same;

FIG. 19A is a view of the adjustable shading member in a condition wherein a vehicle is running on a straight road;

FIG. 19B is a view of a contoured cross-sectional pattern of a beam produced under running of the vehicle on the straight road;

FIG. 20A is a view similar to FIG. 19A, but showing a condition wherein the vehicle is running on a leftward curved road;

FIG. 20B is a view of a contoured cross-sectional pattern of a beam produced under running of the vehicle on the leftward curved road;

FIG. 21A is a view similar to FIG. 19A, but showing a condition wherein the vehicle is running on a rightward curved road;

FIG. 21B is a view of a contoured cross-sectional view of a beam produced under running of the vehicle on the rightward curved road;

DETAILED DESCRIPTION OF THE INVENTION

Figure 1:
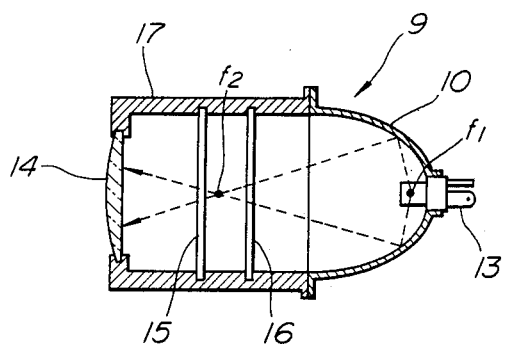
FIG. 1 is a sectional view of a vehicle headlamp which is a first embodiment of the present invention.

Referring to FIGS. 1 to 5C, particularly, FIG. 1, there is shown a projector type headlamp 9 which is a first embodiment of the present invention.

The headlamp 9 comprises an ellipsoidal light reflector 10 having first and second focuses $f_1$ and $f_2$. A lamp bulb 13 is connected to the reflector 10 having its filament located on the first focus $f_1$. A tubular body 17 is coaxially connected to the reflector 10. A converging lens 14 is mounted within a front portion of the body 17. Thus, light rays from the filament are reflected forward by the reflector 10, converged at the second focus $f_2$ and passed through the converging lens 14 to produce parallel light rays which are projected forward from the lens 14.

Located near, but, in front of the second focus $f_2$ is a liquid crystal matrix 15 which serves as a shading means. More specifically, the liquid crystal matrix 15 is positioned at a focus of the converging lens 14. Located behind the second focus $f_2$ is a heat reflecting filter 16 which functions to prevent heat transfer from the light bulb 13 to the liquid crystal matrix 15.

Figure 2:
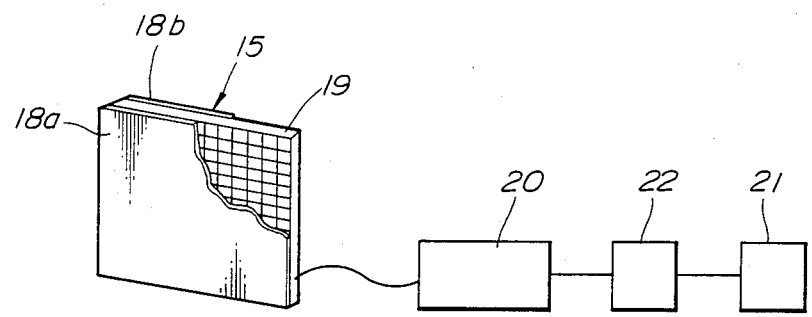
FIG. 2 is a partially cut perspective view of a liquid crystal matrix used as a shade means employed in the present invention.

The construction of the liquid crystal matrix 15 is shown in FIG. 2, which comprises outer and inner polarizing plates 18a and 18b whose polarizing directions are perpendicular to each other and a liquid crystal plate 19 which is sandwiched between the outer and inner polarizing plates 18a and 18b. The liquid crystal plate 19 comprises a plurality of small light transmitting elements which are electrically and independently controlled. Designated by numeral 20 is a drive circuit which drives the elements of the liquid crystal plate 19 in a manner to produce a desired image on the plate 19. Designated by numeral 22 is a microcomputer which memories various, for example, three images for the liquid crystal plate 19. Designated by numeral 21 is a manually controlled switch which is positioned at, for example, the dashboard of a vehicle near the driver's seat. That is, with manipulation of the switch 21, the computer 22 issues signals to the drive circuit 20 to cause the liquid crystal plate 19 to produce a desired image thereon.

FIGS. 3A, 4A, and 5A show three images produced on the plate 19 and FIGS. 3B, 4B and 5B show three contoured cross-sectional patterns of the projected beam which are prepared by the three images respectively. It is to be noted that these three patterns are possessed respectively by so-called high, low and intermediate light beams of the headlamp as will become apparent as the description proceeds. The light transmittance of each element of the liquid crystal plate 19 is described in the chart of FIG. 5C.

As is seen from FIGS. 3A and 3B, when the liquid crystal plate 19 produces no image thereon, that is, when the plate 19 is transparent, the high beam pattern is produced by the headlamp, while, as is seen from FIGS. 4A and 4B, when the plate 19 produces at its upper portion an opaque image, the low beam pattern is produced which has a sectoral shadow at a portion corresponding to the opaque image. Furthermore, as is seen from FIGS. 5A and 5B, when the plate 19 produces an image whose light transmittance increases gradually with increase of the distance from the upper end of the plate 19, the intermediate beam pattern is produced which is used when the vehicle runs with a fog lamp being operated. It is to be noted that such light transmittance differential image as that shown in FIG. 5A is produced by varying the time for which the upper and lower elements of the liquid crystal plate 19 are energized.

It is to be noted that the images illustrated in FIGS. 3A, 4A and 5A are examples. That is, if desired, various shapes of image for the low beam pattern may be used in accordance with the operation modes of the motor vehicle.

Thus, when, in operation, the manual switch 21 is manipulated to assume a certain position, given elements of the liquid crystal plate 19 are energized to produce a predetermined image on the plate 19. The light rays comming directly and indirectly from the light bulb 13 are partially shaded by the image on the plate 19 and thus the converging lens 14 projects therefrom a light beam whose cross-sectional pattern corresponds to the image, as has been mentioned hereinabove.

As will be understood from the foregoing description, in the first embodiment, various types of beam patterns are available from a single light bulb. In fact, various shapes of the image are readily provided by the so-called adjustable light shading means 19. This means that the low beam and the intermediate beam can be provided with various types of cross-sectional patterns in accordance with the modes in which the vehicle operates. Furthermore, since the shape change of the image on the plate 19 is carried out without using a movable member, there is no fear about undesirable flicker phenomenon of the beam pattern.

Figure 6:
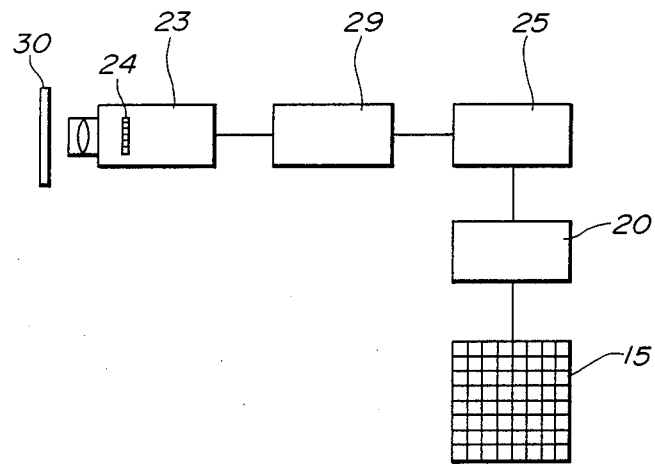
FIG. 6 is a block schematic diagram of a vehicle headlamp which is a second embodiment of the present invention.
Figure 7A:
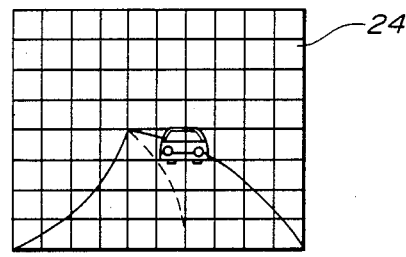
FIG. 7A is a view of an image memory of a CCD camera employed in the second embodiment, showing an approaching vehicle imaged thereon.
Figure 7B:
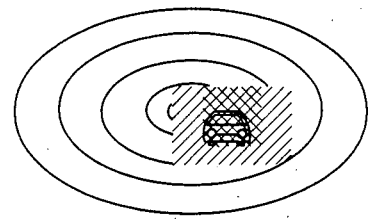
FIG. 7B is a view of a contoured cross-sectional pattern of a beam produced by the second embodiment.
Figure 8:
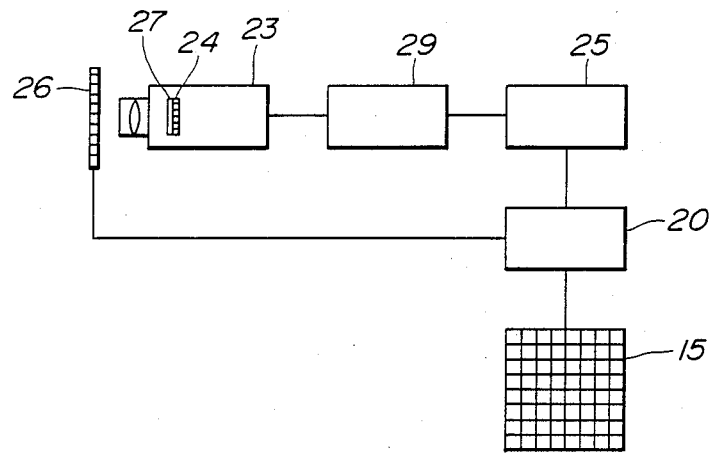
FIG. 8 is a block schematic diagram of a vehicle headlamp which is a third embodiment of the present invention.
Figure 9:
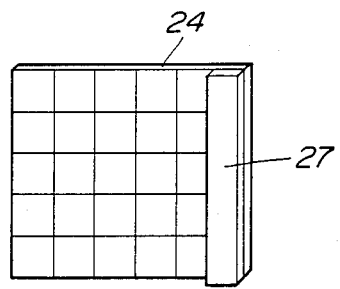
FIG. 9 is a perspective view of a cover member-mounted image memory employed in the third embodiment.

Referring to FIGS. 6, 7A and 7B, there is shown a second embodiment of the present invention.

The vehicle headlamp of this embodiment comprises a CCD (viz., charge coupled device) camera 23 which shoots a headlamp beam projected from an approaching vehicle. Designated by numeral 30 is a ND filter. In accordance with image signals produced by the CCD, the light transmittance of the elements of the liquid crystal matrix 15 is varied or controlled. The camera 23 has an image memory 24 which has picture elements whose number is the same as that of the liquid crystal matrix 15. The image signals from the image memory 24 are treated by a microcomputer 29 and then reversed in signal intensity by an image reversing circuit 25. Thus, the circuit 25 produces a signalled image in which a portion corresponding to the highly illuminated portion of the image memory 24 is opaque. The signals from the image reversing circuit 25 are applied to a drive circuit 20 to energize the liquid crystal matrix 15.

Thus, when the image memory 24 of the CCD camera 23 shoots a head-lighted approaching vehicle as shown in FIG. 7A, the liquid crystal matrix 15 is caused to have an opaque image at a portion corresponding to the portion of the image memory 24 at which the head-lighted vehicle is shot. Thus, the light beam produced by the headlamp has such a pattern as shown in FIG. 7B. That is, the pattern has a shallow at the area where the approaching vehicle is positioned. Thus, the driver on the approaching vehicle is prevented from the blinding phenomenon. This means that, in the second embodiment, a so-called high beam is used without blinding the approaching drivers.

Referring to FIGS. 8, 9, 10, 11 and 12, there is shown a third embodiment of the present invention, which is a modification of the above-mentioned second embodiment.

Figure 10:
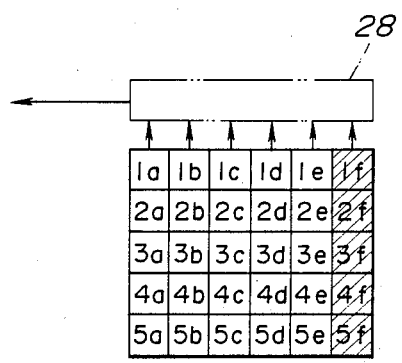
FIG. 10 is a typical view of the image memory employed in the third embodiment.

The vehicle headlamp of the third embodiment comprises a liquid crystal filter 26 which is located in front of the CCD camera 23. The filter 26 has substantially the same construction as the liquid crystal matrix 15. As is seen from FIG. 9, the right side of the image memory 24 is covered with a cover member 27 for preventing the picture elements concealed by the cover member 27 from operation. FIG. 10 is a typical view of the image memory 24. Denoted by numeral 28 in FIG. 10 is a register which registers the signals from the picture elements 1a, 1b, 1c, 1d, 1e, 1f ... 5c, 5d, 5e and 5f in this order, and feeds the signals to the microcomputer 29 successively.

Figure 11:
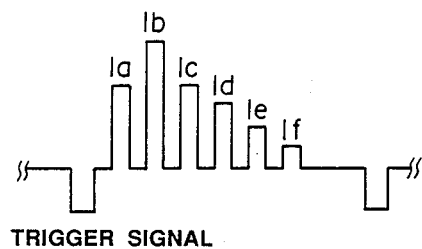
FIG. 11 is a pulse illustration showing levels of image signals produced by the image memory of the third embodiment.

FIG. 11 shows the image signals produced by the image memory 24, more specifically, the image signals produced by the picture elements 1a to 1f. It is to be noted that the pulse denoted by "1f" in FIG. 11 is caused by a noise because the picture element 1f of the image memory 24 is concealed by the cover member 27.

Figure 12:
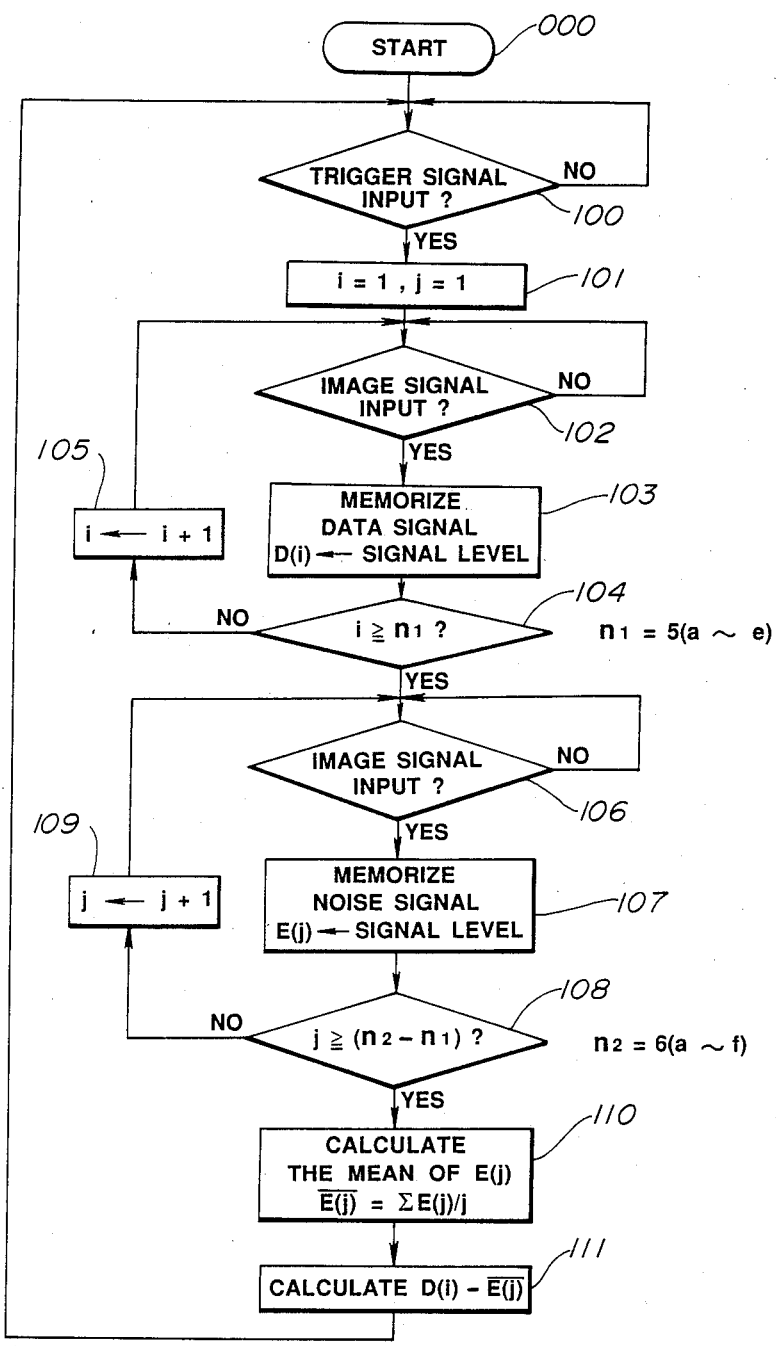
FIG. 12 is a flowchart showing steps programed in a microcomputer for carrying out operation of the third embodiment.

In the following, the steps programed in the microcomputer 29 are depicted by the flowchart shown in FIG. 12.

At steps 000 to 105, the image signals produced by the picture elements 1a, 1b, 1c, 1d, 1e, 2a, 2b, 2c, 2d, 2e .... 5a, 5b, 5c, 5d and 5e are successively read as information signals and at steps 106 to 109, the image signals produced by the picture elements 1f, 2f, 3f, 4f and 5f are read as noise signals. At step 110, the mean value of the noise signals is calculated and at step 111, the value of each infomation signal is reduced by the mean value to output a modified signal which is improved in signal/-noise ratio.

The improved signals from the computer 29 are fed to the signal reversing circuit 25 and then to the drive circuit 20 for producing a desired image on the liquid crystal matrix 15 similar to the case of the afore-mentined second embodiment.

Because of the steps for cancelling the noises, the error which would be created when a very intensive light is applied to the image memory 24 is suppressed or at least minimized in the third embodiment. Furthermore, in this third embodiment, a feedback signal is fed to the liquid crystal filter 26 from the drive circuit 20 for controlling the quantity of incedent light rays upon the image memory 24. Thus, S/N ratio of the image signal is much improved.

Referring to FIGS. 13 to FIG. 21B, there is shown a fourth embodiment of the present invention.

Figure 13:
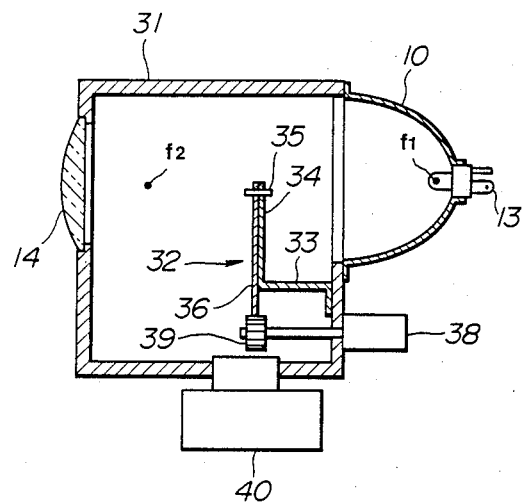
FIG. 13 is a sectional view of a vehicle headlamp which is a fourth embodiment of the present invention.

As is seen from FIG. 13, the headlamp of this embodiment comprises an ellipsoidal light reflector 10 having first and second focuses $f_1$ and $f_2$. A light bulb 13 is connected to the reflector 10 having its filament positioned at the first focus $f_1$. A coverging lens 14 is arranged in front of the reflector 10 in such a manner that a focus of the lens 14 meets the second focus $f_2$ of the reflector 10. The reflector 10 and the lens 14 are held by a tubular body 17. As shown, the tubular body 17 has an enlarged lower portion for mounting therein an adjustable shading device 32.

The shading device 32 comprises a bracket 33 connected to a rear wall of the tubular body 17. The bracket 33 has a front wall 34 which serves as a so-called fixed shading member. To a right upper portion of the front wall 34, there is pivotally connected a sectoral shading member 36 through a pivot pin 35. The pivotal shading member 36 is formed at its arcuate periphery with gear teeth 37 to which a small gear 39 is meshed. The small gear 39 is connected through a shaft (no numeral) to an electric motor 38. Thus, it will be appreciated that the light rays toward the lens 14 are partially shaded by a unit which consists of the fixed shading member 34 and the pivotal shading member 36. More specifically, by controlling the angle by which the pivotal shading member 36 is pivoted, the quantity of the light rays reaching the lens 14 is controlled. Designated by numeral selectively in FIG. 13 is an electric motor 40 which turns the headlamp leftward and rightward. The motors 38 and 40 are controlled in accordance with both the steered angle of the steerable wheels and the vehicle speed.

Figure 15:
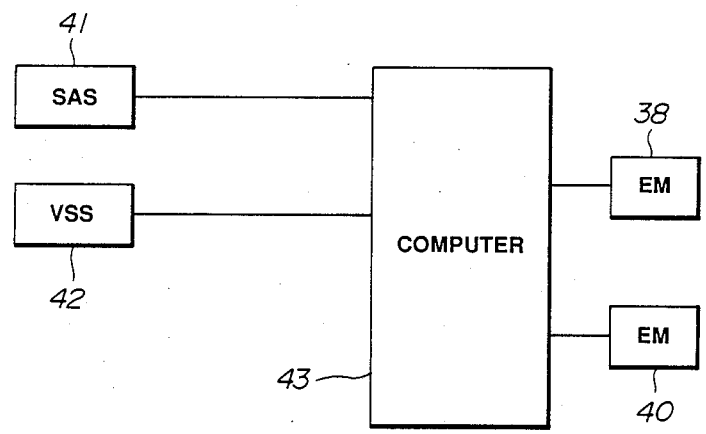
FIG. 15 is a block schematic diagram of the fourth embodiment.

FIG. 15 shows a block diagram of a control circuit for controlling the motors 38 and 40. Designated by numeral 41 is a steering angle sensor which senses the angle by which a steering wheel of the vehicle turns, while, designated by numeral 42 is a vehicle speed sensor which senses the speed of the vehicle. The information signals from the sensors 41 and 42 are fed to a microcomputer 43 by which the information signals are converted to instruction signals. The instruction signals are fed to the motors 38 and 40 for controlling the same.

Figure 16:
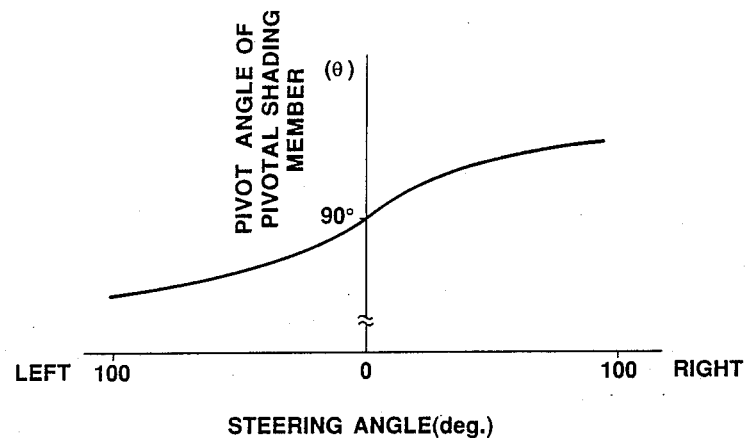
FIG. 16 is a map showing a light shading characteristic of the shade member with respect to the steered angle of a motor vehicle.
Figure 17:
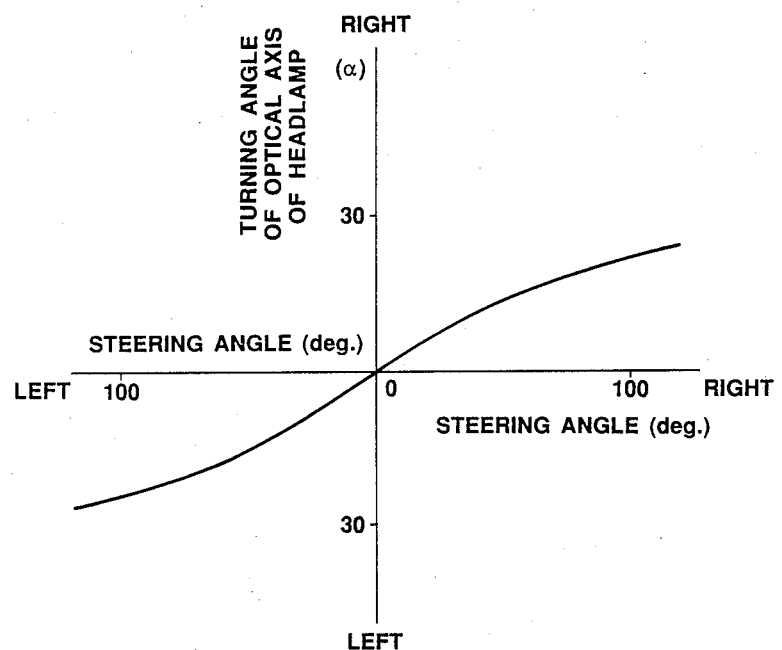
FIG. 17 is a map showing a pivot angle characteristic of the optical axis of the headlamp with respect to the steered angle of the motor vehicle.

FIG. 16 is a map showing the correspondence between the angle "$\theta$" (see FIG. 14) by which the shading member 36 is pivoted and a corrected value $F(\phi)$ of the steering angle of the steering wheel, and FIG. 17 is a map showing the correspondence between the angle "$\alpha$" by which the headlamp (viz., the optical axis of the headlamp) is pivoted rightward or leftward and the corrected value $F(\phi)$ of the steering angle. These correspondences are memorized in memory section of the computer 43.

Figure 14:
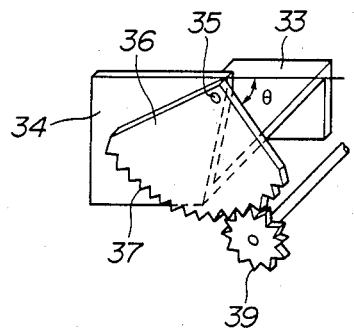
FIG. 14 is a perspective view of an adjustable shading member employed in the headlamp of the fourth embodiment.

As is seen from FIG. 14, the angle "θ" is the angle defined between a line which includes an upper flat edge of the fixed shading member 34 and a right side of the pivotal shading member 36. It is to be noted that the corrected steering angle F(φ) is provided by considering the speed at which the vehicle runs. When the reference vehicle speed is determined 40 Km/h, the corrected steering angle F(φ) is calculated from the following equation.

$$F(\phi) = f(\phi) \times K \times v/40 \quad \ldots(1)$$

where:
F(φ): corrected steering angle,
f(φ): steering angle detected by the steering angle sensor 41,
K: constant, and
v: vehicle speed.

Figure 18:
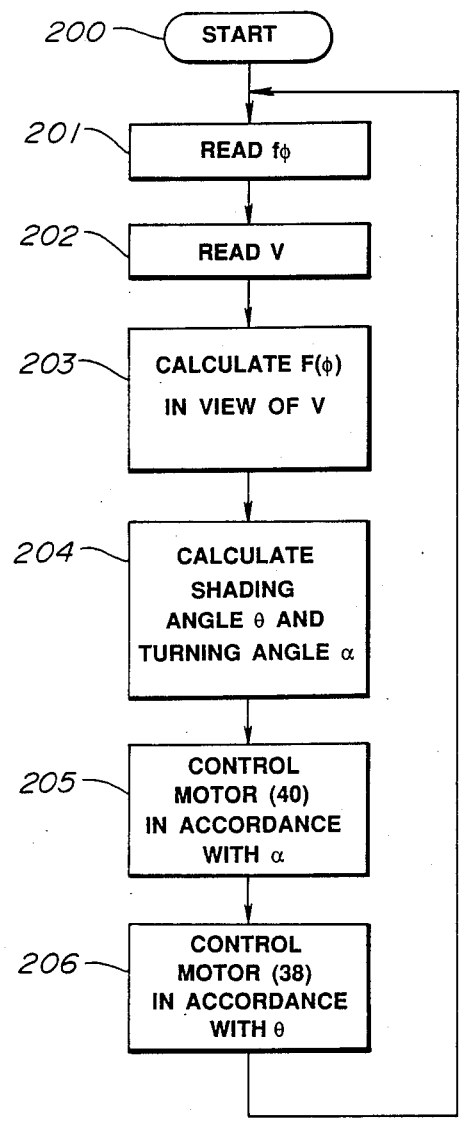
FIG. 18 is a flowchart showing steps programed in a microcomputer for carrying out operation of the fourth embodiment.
Figure 22:
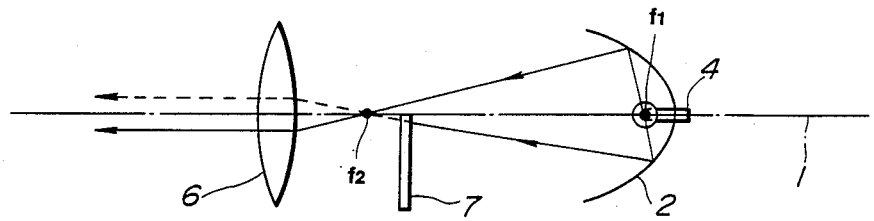
FIG. 22 is a schematic illustration of a conventional projector type vehicle headlamp.
Figure 23:
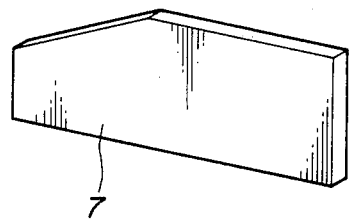
FIG. 23 is a perspective view of a shade member employed in the conventional headlamp.

In the following, the steps programed in the microcomputer 43 will be described with reference to the flowchart shown in FIG. 18.

At steps 201 and 202, the momentarily changing steering angle f(φ) and vehicle speed v, which are detected by the steering angle sensor 41 and the vehicle speed sensor 42, are read. At step 203, a corrected steering angle F(φ) corresponding to the vehicle speed v is calculated, and at step 204, the shading angle θ of the pivotal shading member 36 and the pivoting angle (α) of the optical axis of the headlamp are both calculated with reference to the correspondences depicted by the graphs of FIGS. 16 and 17. At step 205, the motor 40 is controlled in accordance with the calculated pivoting angle (α), and at step 206, the motor 38 is controlled in accordance with the calculated shading angle θ.

FIGS. 19A, 20A and 21A show three positions which the pivotal shading member 36 assumes, and FIGS. 19B, 20B and 21B show three contoured cross-sectional patterns of the light beam produced by the headlamp, which are prepared by the shading member 36 when the member 36 assumes the positions of FIGS. 19A, 20A and 21A.

That is, when the vehicle is runnig on a straight road, the steering angle detected by the steering angle sensor 41 is substantially zero. Thus, as is seen from FIG. 19A, under this condition, the shading angle $\theta_1$ of the pivotal shading member 36 is controlled to about 90 degrees, so that, as is seen from FIG. 19B, the headlamp projects a light beam whose cross-sectional pattern has at its right upper portion a shallow 45.

When the vehicle is running on a leftwardly curved road, the steering angle detected by the steering angle sensor 41 is a negative value. Thus, as is shown in FIG. 20A, under this condition, the shading angle $\theta_2$ of the shading member 36 is controlled smaller than 90 degrees. Thus, as is seen from FIG. 20B, the cross-sectional pattern of the projected beam has at its upper portion a relatively large shallow 46.

When the vehicle is running on a rightwardly curved road, the steering angle is a positive value. Thus, as is shown in FIG. 21A, the shading angle $\theta_3$ of the shading member 36 is controlled larger than 90 degrees. Thus, under this condition, the cross-sectional pattern of the projected beam has at its right upper portion a smaller shallow 47.

Thus, as will be seen from FIGS. 19B, 20B and 21B each showing a left way on which the correponding vehicle runs and a right way on which an approaching vehicle runs, the shallow 45, 46 or 47 provided in the pattern of the beam substantially covers the right way.

In other words, the light beam produced by the head-lamp of the fourth embodiment comprises a so-called low beam which is directed toward the right way (viz., opposite lane) and a so-called high beam which is directed toward the left way. Thus, undesired blinding phenomenon to approaching drivers is suppressed or at least minimized and a clear distant view is given to the driver on the left way.

Although, in the fourth embodiment, the reference vehicle speed is determined 40 km/h, the speed is not limited to such value. Furthermore, if desired, the steering angle sensor may be replaced with a G-sensor which detects a lateral component of gravity when the vehicle turns a corner. Furthermore, if desired, the shading device 32 may be replaced with a liquid crystal matrix of the type which has been described in the first embodiment. In this modification, by operating the microcomputer based on the information signals from the steering angle sensor and the vehicle speed sensor, the liquid crystal matrix is controlled to form thereon opaque images which correspond to the images which are shaped by the fixed shading member 34 and the pivotal shading member 36. Although, in the fourth embodiment, the control for the leftward and rightward pivoting of the headlamp proper is effected in addition to the control for the shading device 32, the former may be removed. In this disclosure, there is shown and described only the prefered embodiment of the invention, but, as aforementioned, it is to be understood that the invention is capable of use in various other combinations and environments and is capable of changes or modifications within the scope of the inventive concept as expressed herein.

What is claimed is:
1. A vehicle headlamp, comprising:
an ellipsoidal light reflector having first and second focuses;
a light source positioned at said first focus, so that light rays produced by said light source are reflected forward by said light reflector and converged at said second focus;
a converging lens positioned in front of said second focus;
a shading device positioned near said second focus for partially shading the light rays which have been reflected by said light reflector; and
control means for controlling the shading characteristic of said shading device,
wherein said shading device comprises a liquid crystal matrix which has a plurality of small light transmitting elements independently and electrically controlled by said control means.

2. A vehicle headlamp as claimed in claim 1, wherein said liquid crystal matrix comprises:
outer and inner polarizing plates which face each other in such a manner that their polarizing directions are perpendicular to each other; and
a liquid crystal plate sandwiched between said outer and inner polarizing plates, said liquid crystal plate including the plurality of small light transmitting elements.

3. A vehicle headlamp as claimed in claim 2, wherein said plurality of light transmitting elements produce a given image on said liquid crystal plate when some of the elements are electrically energized.

4. A vehicle headlamp as claimed in claim 3, wherein said image comprises an opaque part, a semitransparent part and a transparent part.

5. A vehicle headlamp as claimed in claim 4, wherein said control means for controlling the characteristic of the liquid crystal matrix is a switch which is manually operated.

6. A vehicle headlamp as claimed in claim 4, further comprising:
   a heat reflecting filter which is located behind said liquid crystal matrix for preventing heat transfer from said light source to said liquid crystal matrix.

7. A vehicle headlamp as claimed in claim 4, in which said control means for controlling the characteristic of the liquid crystal matrix is an automatic conrol means which controls said characteristic in accordance with an operation mode of the vehicle.

8. A vehicle headlamp as claimed in claim 7, in which said control means comprises a CCD (charge coupled device) camera having an image memory installed therein, said image memory issuing iamge signals by which the light transmittance of each light transmitting element of said liquid crystal matrix is controlled.

9. A vehicle headlamp as claimed in claim 8, in which said image memory includes a plurality of picture elements whose number is the same as that of said liquid crystal matrix.

10. A vehicle headlamp as claimed in claim 9, in which said control means further comprises an image reversing circuit by which the image signals from said image memory of the CCD camera are reversed in signal intensity.

11. A vehicle headlamp as claimed in claim 10, further comprising a ND filter which is arranged in front of said CCD camera.

12. A vehicle headlamp as claimed in claim 10, in which one side of the image memory of said CCD camera is covered with a cover member for preventing the picture elements concealed by the cover member from operation.

13. A vehicle headlamp as claimed in claim 12, further comprising a liquid crystal filter which is arranged in front of said CCD camera.

* * * * *